United States Patent [19]
Wittry

[11] Patent Number: 5,537,973
[45] Date of Patent: Jul. 23, 1996

[54] ROTARY ENGINE WITH GLOW IGNITION SYSTEM

[76] Inventor: David B. Wittry, 1036 S. Madison Ave., Pasadena, Calif. 91106-4365

[21] Appl. No.: 504,241

[22] Filed: Jul. 19, 1995

[51] Int. Cl.$^6$ .................................................. F02B 53/12
[52] U.S. Cl. ........................ 123/202; 123/211; 123/245
[58] Field of Search .................................. 123/211, 245, 123/202; 418/36

[56] References Cited

U.S. PATENT DOCUMENTS

| 3,356,079 | 12/1967 | Rolfsmeyer | 418/36 |
| 5,433,179 | 7/1995 | Wittry | 418/36 |

FOREIGN PATENT DOCUMENTS

| 2158995 | 5/1972 | Germany | 123/211 |

OTHER PUBLICATIONS

Gierke, C. David, 2-Stroke Glow Engines for R/C Aircraft, Air Age Publishing, Wilton CT (194) pp. 20–24, 28, 29.
Higley, Harry, All About Engines Harry B. Higley & Sons, Inc, Glenwood, IL (1992) p. 29.

Primary Examiner—Michael Koczo

[57] ABSTRACT

A rotary engine in which two rotors having interleaving radial vanes revolve inside a cylindrical cavity and are connected to a planetary output gear system which causes them to alternately speed up and slow down. The radial vanes divide the cylindrical cavity into four chambers in which intake, compression, explosion and exhaustion occur. At least two glow plugs, each of which contains a coil of refractory wire, are located at different angular positions relative to the axis of the cavity. The glow plugs are selected so that one, which cools more rapidly than the other, will cause ignition at an earlier time than another of the glow plugs that cools more slowly. A passageway containing an adjustable, pressure-sensitive, valve vents the compression chamber to the intake chamber to allow the compression ratio to be varied, to allow a greater expansion ratio than compression ratio, and to allow adjustment of the time at which ignition occurs during each cycle.

16 Claims, 5 Drawing Sheets

ROTARY ENGINE WITH GLOW IGNITION SYSTEM

BACKGROUND—FIELD OF THE INVENTION

This invention relates to internal combustion rotary engines having rotors that move inside a cylindrical cavity with cyclic rotary motion superposed on uniform rotary motion. It is concerned specifically with a glow ignition system whereby such engines can be operated with other fuels instead of being limited to methanol-based fuels as are other glow ignition engines.

BACKGROUND—PRIOR USE OF GLOW IGNITION SYSTEMS

Glow ignition for internal combustion engines was introduced in the late 1940's by Arden as described in the book by Gierke (2-Stroke Glow Engines for R/C Aircraft, pp 21–24). Glow ignition rapidly replaced the spark ignition systems that were previously used because it was simpler, lighter weight, lower cost, and more reliable. However, it required the use of methanol-based fuels and hence was utilized only in very small engines used to propel model airplanes, model boats and model cars.

In a glow ignition system, a coil of platinum alloy wire contained in the glow plug is heated by passing current through it while the engine is started. After the engine has been started, the battery supplying current to the coil is removed and the engine not only continues to run, but also can be throttled from high speeds to lower speeds without the use of a separate mechanism to control the time of ignition. There are several reasons that this is possible, namely a) the platinum wire element serves as a catalyst for oxidation of the methanol, b) the fuel-air mixture is heated by compression, and c) the glow plug element looses heat to the cylinder head and to the fresh fuel-air intake mixture before this mixture has been compressed to the point where ignition can take place.

The balance between heating and cooling of the glow element establishes the time at which ignition takes place. As the engine speeds up under throttle control, the glow element cools less between cycles and the ignition time is advanced, much like the automatic advance systems used in spark ignition engines. An earlier time of ignition is promoted by the use of a glow plug that cools less between cycles (a so-called "hot plug") and a later time of ignition is promoted by the use of a plug that cools more between cycles (a so-called "cold plug") as described in Gierke's book, pp. 28 & 29.

One of the serious disadvantages of the conventional glow ignition system is that it cannot be used with fuels other than methanol or methanol-nitromethane mixtures. Methanol is an ideal fuel for use with glow ignition, but is more expensive and less readily available than gasoline in some countries. Addition of nitromethane cures some, but not all, of the problems of running glow ignition with gasoline—but it costs 10 times as much as methanol.

If gasoline is used as a fuel in a glow ignition engine, there is a tendency for preignition and rough running as noted by Higley in his book (All About Engines, p.29). This results from the difference in properties of gasoline and methanol. First, ordinary gasoline has an octane rating of typically 87–92 compared with methanol which has an octane rating of 98 (refer to Obert, Internal Combustion Engines, p. 225). Second, gasoline has a higher specific energy content (43,000 kJ/kg) compared to methanol (19,700 kJ/kg), and it has a lower heat of vaporization (350–400 kJ/kg) compared to methanol (1000 kJ/kg) as stated by Thomas (refer to Chapter 5 in the book by Arcoumanis, Internal Combustion Engines, p. 263). Third, oxidation of gasoline is less readily catalyzed by the platinum alloy of a glow plug element than is methanol. Finally, the quantity of liquid fuel passing through an engine of given power output is less for gasoline which has a stoichiometric air-fuel ratio of 14.7 compared to 6.4 for methanol. Thus, the problems of using fuels other than methanol with glow ignition are many, and there is no single solution that will cure all of them. Adding nitromethane helps to avoid detonation by increasing the combustion time but is costly. Lowering the compression ratio is necessary to reduce the tendency for preignition but this lowers the efficiency and the power output. Providing more cooling of the engine to compensate for the smaller mass of fuel used and the lower heat of vaporization increases the engine weight. Using a colder plug improves the high speed operation but interferes with the ability of the engine to idle at low speed.

In addition to these problems, a most serious disadvantage of glow ignition is one that is present even when methanol-based fuel is used. Once the design of the engine (and hence the compression ratio) is fixed and the glow plug and fuel formula are selected, the only parameter that can be used to adjust the ignition timing is the fuel-air mixture. This must be set on the fuel-rich side of the stoichiometric mixture in order to avoid detonation (refer to Peter Chinn's book, Model Four-stroke Engines, pp. 92–94). While this may be acceptable for very small engines that are used in limited numbers (e.g. model airplane engines), it is not acceptable for engines in wide usage because of poor fuel economy and excess unburned hydrocarbons in the exhaust.

All of the disadvantages and problems of the use of glow ignition discussed in the foregoing are overcome by the present invention.

OBJECTS AND ADVANTAGES OF THE PRESENT INVENTION

The object of this invention is to provide an engine which has the following advantages over conventional reciprocating-piston engines: a) larger intake and exhaust ports, b) no requirement for separate valves and camshaft, c) more uniform torque, d) less vibration, e) higher power-to-weight ratio, f) lower exhaust noise, g) lower exhaust temperature, h) higher overall efficiency, i) high efficiency over a wider range of speeds, j) operation with readily available automotive fuels, and k) operation with a simple, inexpensive and reliable ignition system. The first five of these advantages are inherent advantages of rotary engines over reciprocating-piston engines. The latter six of these advantages are provided specifically by the present invention.

A further object of the present invention is to provide a rotary engine that overcomes the disadvantages of the Wankel rotary engine by having simpler construction, higher thermal efficiency and the possibility of more complete combustion of the fuel.

The present invention is a form of rotary engine that has a simple glow ignition system and yet provides for operation with a variety of fuels. It affords the possibility of high efficiency with various types of fuels and also lower emissions than normally provided by engines with glow ignition and engines with two-stroke cycle operation.

SUMMARY OF THE INVENTION

The rotary engine of the present invention is similar to ones described in U.S. Pat. No. 5,433,179 and the references cited therein. It has two interdigitated rotors, each of which has two vanes located 180 degrees apart. The rotors move in a cylindrical cavity with cyclic rotary motion superposed on uniform rotary motion. One way to accomplish the desired motion consists of a planetary transmission gear with planet gears having half the radius of a fixed sun gear. The shafts connected to the planet gears contain cranks that drive connecting rods linked to cranks on the rotors. However, other mechanisms having internal and external gears, or elliptical gears, or cams could also be used. The two vanes of each of the rotors divide the cylindrical cavity into four chambers whose size changes in such a way that the four cycles of an Otto cycle engine occur in one revolution of the output shaft. As in U.S. Pat. No. 5,433,179, a variable compression ratio and an expansion ratio greater than compression ratio is obtained by venting the chamber in which compression occurs to an adjacent chamber by means of a duct connecting these two chambers.

Ignition is done in the present invention by multiple glow plugs. At least one glow plug is located in the housing at an angular position that corresponds closely to the position where the compressed fuel-air mixture gas has minimum volume. In addition, one or more glow plugs are located at an angular position that corresponds to the position where the fuel-air mixture gas has not yet been compressed to its minimum volume. The first glow plug (or plugs) remains active at all times regardless of whether the engine is going fast or slow, while the second plug (or plugs) operates to cause ignition only when the engine is traveling at speeds higher than the idling speed. The operation of the two plugs in this way is possible because in reciprocating-vane rotary engines the volume of the compressed fuel-air mixture is moving while it is also changing its size.

DESCRIPTION OF THE FIGURES

FIGS. 4aa, 4bb, and 4cc are drawings which show the type of glow plug used in the glow ignition system.

DETAILED DESCRIPTION OF THE INVENTION

Figure 1A:
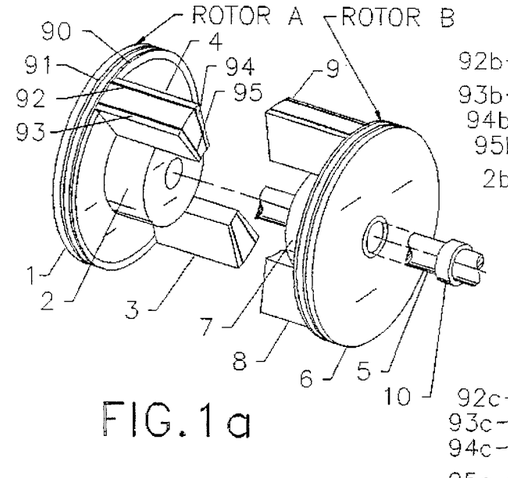
FIG. 1a, 1b, and 1c are exploded views of three alternative types of rotors of the type used in reciprocating-vane rotary engines.

The glow ignition system of the present invention is intended for use with a basic rotary engine of the so-called cat-and-mouse type. One form of such an engine utilizes two rotors connected to a planetary gear drive as in U.S. Pat. No. 5,433,179. In one version, rotor A consists of a circular end plate 1 having a hub 2 and diametrically opposed radial vanes 3 and 4. Similarly, rotor B consists of a circular end plate 6 having a hub 7 and diametrically opposed radial vanes 8 and 9. Rotor A has an axial shaft 5 rigidly attached to it. When the two rotors are interdigitated or nested together, a shaft 5 passes through an axial hole of appropriate size in rotor B so that rotor B is free to rotate about shaft 5. The two rotors seal may against each other on their contacting surfaces. A thrust bearing 10 located on shaft 5 constrains rotor B relative to rotor A and prevents the two rotors from moving apart.

The rotors of FIG. 1a contain one or more sealing rings such as 90 and 91 located on the circumference of the circular end plates 1 and 6, as well as peripheral sealing strips 92 and 93, and radial sealing strips such as 94 and 95 located on the vanes 3, 4, and 8, 9. In large engines, these sealing strips are required in order to allow for differential thermal expansion of the rotors and the housing in which they are used.

Figure 1B:
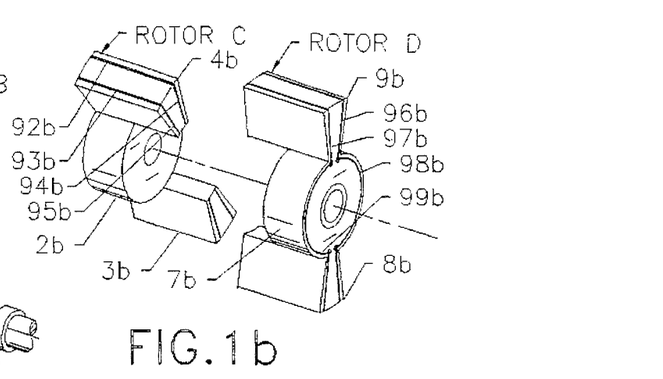
Figure 1C:
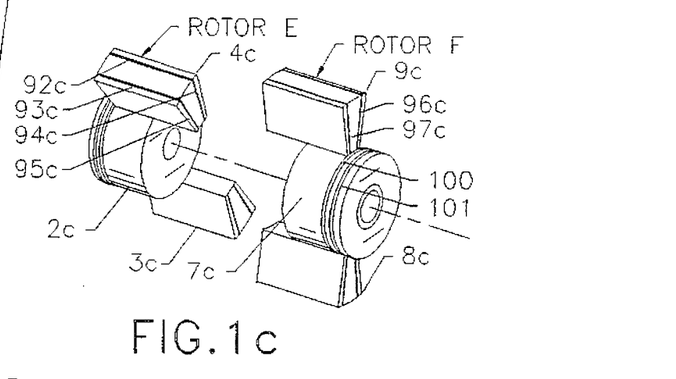

Alternative forms of the rotors are shown in FIG. 1b and FIG. 1c. Each of the rotors in FIG. 1b have a hub 2b (or 7b) and two vanes 3b and 4b (or 8b and 9b). The vanes have peripheral sealing strips, e.g. 92b and 93b, and radial sealing strips, e.g. 94b and 95b. In addition, the distal ends of the vanes contain radial sealing strips, e.g. 96b and 97b, and the distal faces of the hubs contain arcuate sealing strips, e.g. 98b and 99b. Sealing strips 98b and 99b may be connected to strips 96b an 97b by link blocks in a manner as is well known in rotary engine technology.

FIG. 1c shows rotors similar to those shown in FIG. 1b but having hubs 2c and 7c whose distal ends extend beyond the vanes and contain sealing rings such as 100 and 101.

It will be understood by those familiar with similar rotary engines that the inner partially cylindrical portion of the vanes of the rotors shown in FIGS. 1a, 1b, and 1c could have sealing strips to improve the seal with the hub of the mating rotor. In addition, the proximal face of the hub of one rotor could have arcuate sealing strips like 98b and 99b to improve the seal with the face of the hub of the mating rotor. However, these sealing strips are less important than the ones shown in the Figures because the two rotors would usually be made of the same material and would operate at similar average temperatures.

Alternatively, the hubs of the rotors shown in FIGS. 1b and 1c could be tapered and the seal between the mating surfaces could be maintained by a constraining means or a thrust bearing that allows the rotors to rotate relative to each other but prevents them from moving apart.

Figure 2:
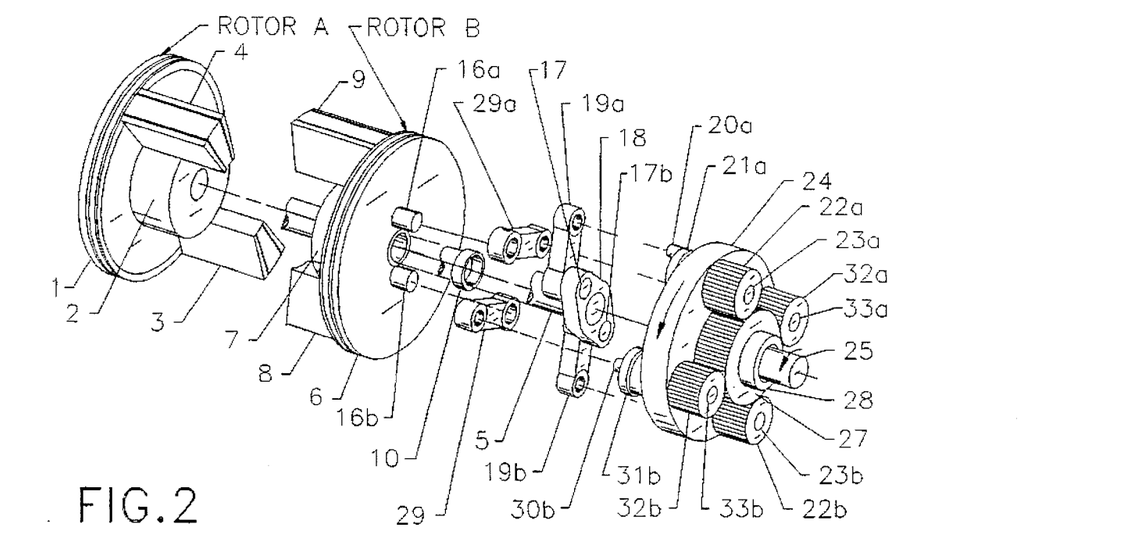
FIG. 2 shows a planetary gear drive for a rotary engine consisting of one sun gear and four planet gears.

A preferred form of planetary gear transmission system for the motion of the rotors shown in FIG. 2. This Figure shows a balanced gear transmission system with four planetary gears and a single sun gear. In this Figure, based on rotors of the type shown in FIG. 1a, letters a and b are used following numerals to denote similar parts on the same drawing. In this transmission system, a crank 18 connected to rotor A by a shaft 5 has two diametrically opposed arms containing two crank pins 17a and 17b that engage two connecting rods 19a and 19b. These connecting rods drive separate crank disks 21a and 21b (not shown) through two pins 20a and 20b (not shown). The crank disks 21a and 21b are connected to two diametrically opposed planet gears 22a and 22b by two shafts 23a and 23b.

The planet gears 22a and 22b roll about a sun gear 27 having a hub 28 that is fixed to the gear housing (not shown). Rotor B has two diametrically opposed crank pins 16a and 16b that engage two connecting rods 29a and 29b. These connecting rods couple with two crank pins 30a (not shown) and 30b on separate crank disks 31a (not shown) and 31b. The crank disks drive diametrically opposed planet gears 32a and 32b via separate shafts 33a and 33b. In this balanced drive, the planet gears 22a and 22b are located at an angular position 90 degrees from the planet gears 32a and 32b about the axis of the planet cage 24. It can be seen from FIG. 2 that entire gear transmission has nearly perfect axial symmetry about the drive shaft. This not only provides for less vibration and higher operating speeds but also provides better balance of forces and the possibility of greater power transmission due to the doubling of the number of planet gears, crank disks, connecting rods and pins.

Figure 3:
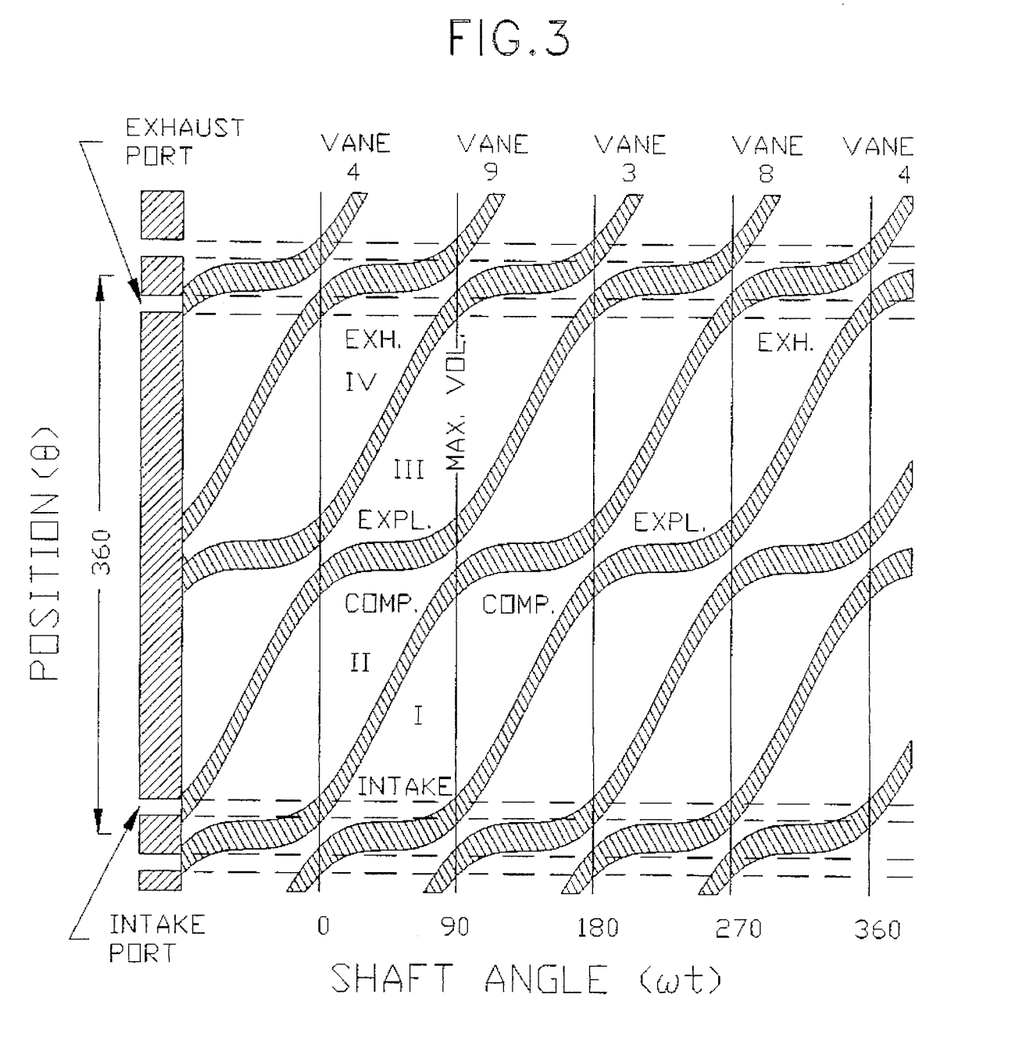
FIG. 3 shows the time dependence of the position of the vanes in a typical reciprocating-vane rotary engine.

When rotors of the type shown in FIGS. 1a, 1b, and 1c are used with the planetary drive of FIG. 2, the rotors move with oscillatory angular motion superposed on uniform angular motion. For schematically representing this motion, we can use the following equation to represent the position of the vanes:

$$\theta(deg) = [2\omega t + n\pi + sin(2\omega t + n\pi)](180/\pi) \tag{1}$$

where $\theta$ is the angular position of a vane relative to the housing, $\omega$ is the angular velocity of the output shaft (rad/sec), t is the time, and n is an integer that is even or odd depending on the rotor. FIG. 3 shows plots derived from Eq. (1). The four spaces between the rotors are labeled chambers I, II, III and IV for a shaft angle between 0 and 90 degrees. While intake is occurring in chamber I, compression is occurring in chamber II, expansion is occurring in chamber III and exhaustion is occurring in chamber IV.

For the planetary drive, the actual equation will be considerably more complicated and the curves will have slightly different shape. Nevertheless, FIG. 3 illustrates the important features of reciprocating-vane rotary engines, namely: a) as the rotors move about their axis, the volume between them changes size, from a maximum to a minimum twice as $\omega t$ changes by 360 degrees, b) the maximum volume occurs in one chamber between the vanes when minimum volume occurs in an adjacent chamber, c) the vanes have a dwell in their motion that always occurs at the same values of $\theta$, and d) as the volume between the vanes changes size, the position of the centroid of that volume is also changing. The first three of these features provides the timing of the intake and exhaust portions of the four-stroke cycle.

The last of these features provides for timing of the ignition. Moreover it also provides the possibility that ignition plugs can be located at more than one position in the housing (i.e. value of $\theta$). An ignition plug at one position can correspond to a volume of the compressed fuel-air mixture close to the minimum volume while another ignition plug (or plugs) can correspond to a volume of the compressed mixture in advance of the position of minimum volume. This point will be discussed further in conjunction with FIG. 5.

Figures 4, 4A, 4B, 4C:
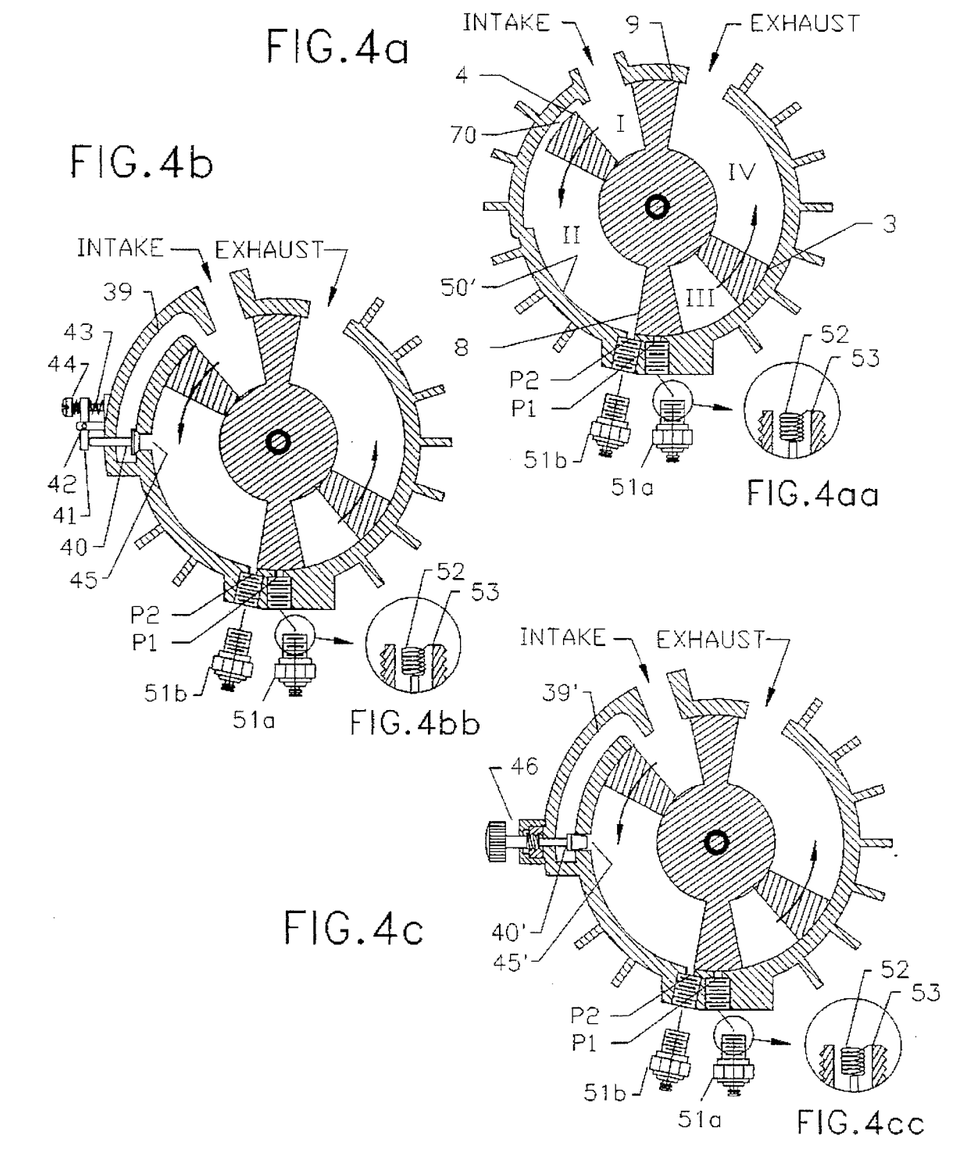
FIGS. 4a, 4b, and 4c are drawings which show different forms of rotary engines that have a glow plug ignition system and an expansion ratio greater than compression ratio.

FIGS. 4a, 4b, and 4c show views of the rotary engine normal to the rotor axis. In FIG. 4a, as in FIG. 3, the four chambers representing the volume between the rotor vanes are labeled I, II, III and IV. In FIGS. 4a, 4b, and 4c a duct or passageway connects the chamber in which compression takes place (e.g II) back to the intake chamber (e.g. I. By passage of some of the fuel-air mixture through the duct, the net compression ratio becomes smaller than the expansion ratio. In FIG. 4a, a simple duct 70 in the wall of the cylindrical cavity 50 is used, as in the principle of "vented compression" described in U.S. Pat. No. 5,433,179. In FIG. 4b, the duct or passageway designated by 39 contains a pressure sensitive valve, as in the principle of "controlled vented compression" and in FIG. 4c, the duct designated by 39' contains a simple value which used to provide "adjustable vented compression".

Also, in FIGS. 4a, 4b, and 4c, two glow ignition plugs 51a and 51b are shown. Plug 51a is located at position P1 and plug 52b is located at position P2. P1 and P2 differ principally in their angular location about the axis of the cylindrical cavity, although they may also be offset in the longitudinal direction (out of the plane of the drawing) in order to avoid interference with each other. The glow plugs, which are shown in detail in FIGS. 4aa, 4bb and 4cc, contain a coil of wire 52 consisting of a metal or alloy which has a high melting point and is suitable for ignition of the fuel air mixture. This coil has one end attached to the plug housing 53 and the other end attached to an insulated electrical feed-though as in conventional glow plugs.

In FIG. 4b, the passageway 39 extending annularly around the cylindrical rotor housing may be a passageway located in the housing or in a separate duct outside the housing that has connections through the external radial wall of the housing. This passageway is provided with a one-way, pressure-activated control element, this is shown for purposes of illustration in FIG. 4b as a poppet valve 40 contacting a rocker arm 41 supported by a pivot 42 and loaded by a spring 43. The valve 40 may remain closed when the engine is running at high speed because air cannot flow fast enough into the intake to provide complete induction. However, at moderate speeds and especially when accelerating from low speeds, as compression takes place, the gas pressure builds up high enough to open the valve 40 and prevent over-compression which would result in preignition.

In FIG. 4b, a screw 44 is used to adjust the spring force on the poppet valve 40 so that the compression ratio can be varied in order to accommodate various grades of gasoline or various alternate fuels. For example, a higher spring pressure would cause the poppet valve to remain closed longer and the compression ratio could be made higher.

A suitable location of the port 45 of FIG. 4b or port 45' of FIG. 4c determines the base compression ratio for a given intake port position and vane width. Similarly, in FIG. 4a, the geometry establishes a base compression ratio. The compression ratio may be modified by the valves of FIG. 4b and FIG. 4c during engine operation. The valve 40' of FIG. 4c contains an adjustment structure 46 whereby the conductance of the duct 39' may be changed either manually or by a linkage to the engine throttle. An increase of the compression ratio to values greater than the base compression ratio will advance the point at which ignition occurs.

This type of adjustment is important when gasoline-type fuels are used because, unlike methanol-containing fuel mixtures, gasoline does not have fixed volatility nor does it always have the same ignition characteristics in the presence of a hot catalyst. Gasolines that are used in automobiles are not simple mixtures of specific hydrocarbons; their formulations vary as a function of manufacturer, grade of gasoline, and seasonal or regional considerations. However, as far as the base compression ratio is concerned, for use with gasoline having an octane rating of 87, the base compression ratio should typically not be greater than 6 in order to avoid preignition problems. Fortunately, gasolines no longer contain tetraethyl lead but use alcohols as octane enhancers—resulting in better performance when using glow ignition due to the improved catalytic behavior.

Figure 5:
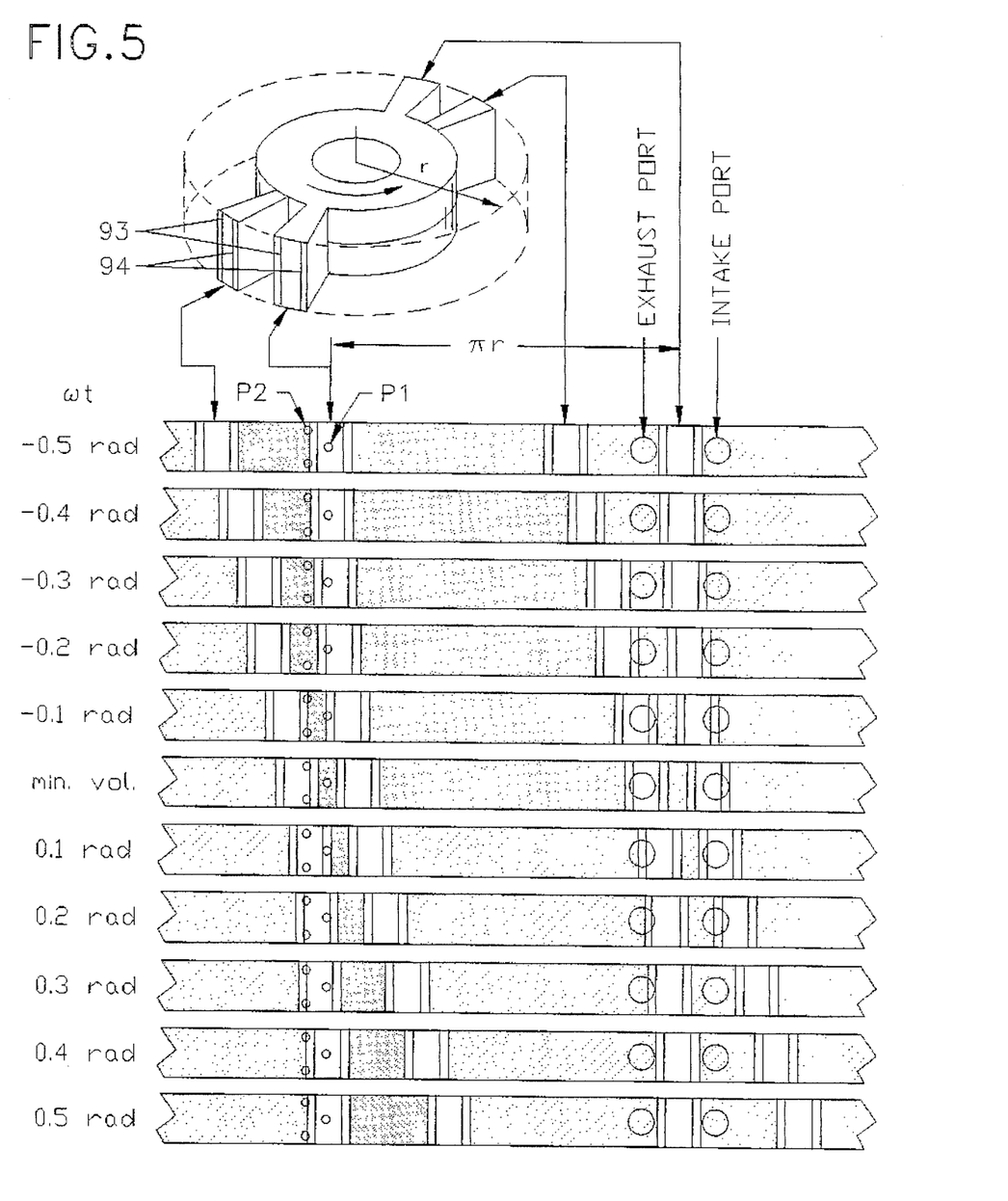
FIG. 5 is a drawing showing the position of the vanes when close to the ignition point relative to the location of the intake and exhaust ports and the location of the glow ignition plugs.

FIG. 5 shows details concerning the position of the vanes as a function of time. This figure shows the actual vane positions for the planetary gear drive system described in U.S. Pat. No. 5,433,179 for the following values of the parameters discussed therein: U=0.70, V=1.43, and L=2.55.

The vanes shown have peripheral sealing strips, e.g. 93 and 94, and the position of the glow plugs P1, and P2, are indicated on this figure. The glow plug at position P1 is a "hot plug". It also retains heat due to being shielded most of the time by the rotors. This plug maintains the ignition when the engine is idling. The glow plug (or plugs) at position P2 is a cold plug. It should cool sufficiently between cycles so that the ignition point when the engine is running at high speed is advanced, but not advanced too far. Optimum ignition timing is adjusted by varying the compression ratio while the engine is running.

Figure 6:
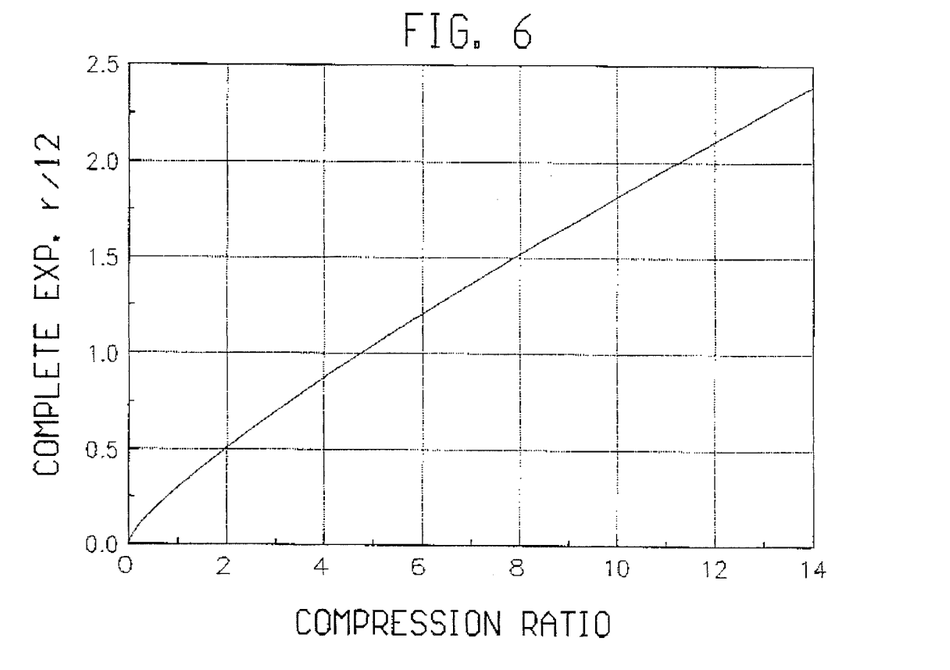
FIG. 6 is a plot of the expansion ratio for complete expansion as a function of the compression ratio.

In the present invention, varying the compression ratio has only a minor effect on the engine efficiency—this being determined mainly by the expansion ratio. This is illustrated in FIGS. 5 and 6. FIG. 6 shows the variation of the expansion ratio required for complete expansion as a function of compression ratio. Complete expansion is defined as that expansion which will reduce the exhaust gas pressure to atmospheric pressure. This expansion ratio is given by Stone (Introduction to Internal Combustion Engines, p. 53), namely:

$$r_e = \sqrt[\gamma]{(\theta r_c + r_c^\gamma)} \quad (2)$$

where $\gamma$ is the ratio of the specific heat at constant pressure to the specific heat at constant volume and $\theta$ is the ratio of the temperature after constant volume combustion to the temperature before combustion has taken place. In FIG. 6, $r_e/12$ is plotted for convenience in examining the case where the expansion ratio is 12. The value of $\gamma$ is assumed to be 1.4, and $\theta$ is taken as 5, although it can be considerably larger than this. It can be seen that for a compression ratio of 6, the expansion ratio for complete expansion is slightly greater than 12 for $r_c=6$.

Figure 7:
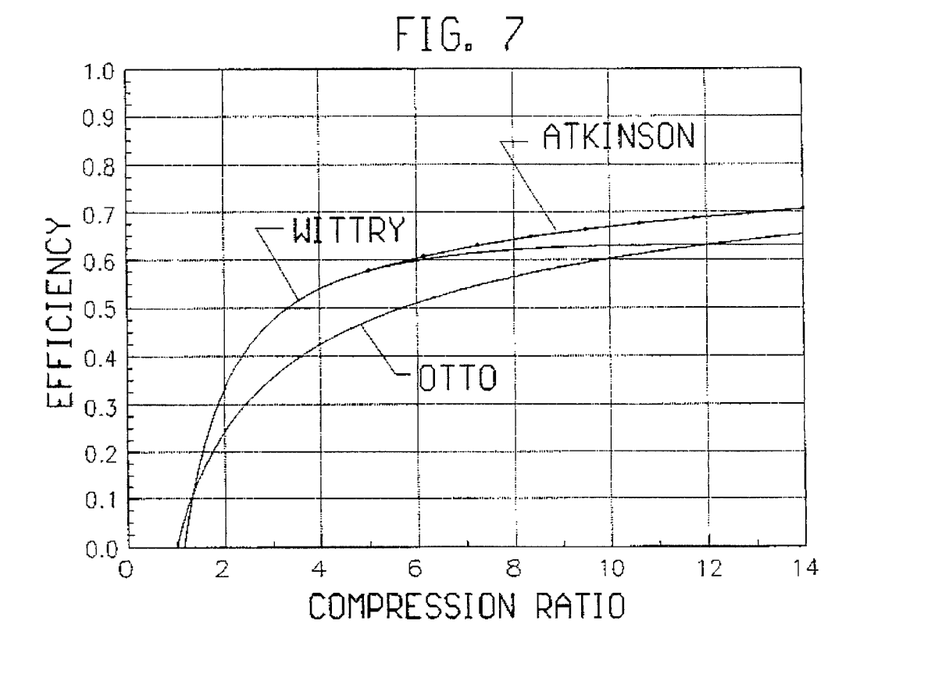
FIG. 7 shows plots of the efficiency versus compression ratio for three different types of cycles.

Continuing with this example, the efficiency is plotted in FIG. 7 as a function of compression ratio $r_c$ for $r_e=12$ and $\theta=5$. This curve (which does not include pumping loss) is labeled 'Wittry' and is compared with the efficiency for complete expansion (labeled 'Atkinson') and for the compression ratio equal to the expansion ratio (labeled 'Otto'). The plots are derived from Eq. 1 and the general equation given by Stone:

$$\eta = 1 - [(\gamma-1)r_e^\gamma + r_c(\theta - \gamma r_e^{\gamma-1}) + r_c^\gamma]/(\theta r_c r_e^{\gamma-1}) \quad (2)$$

where $r_e$ is the expansion ratio, $r_c$ is the compression ratio and the other quantities are as defined previously.

From FIG. 7 it can be seen that the Wittry curve provides considerably higher theoretical efficiency than the Otto curve for $r_c$ between 6 and 12 due to the more complete expansion. In fact, it is more like the efficiency for the Otto curve at $r_c=10$. Also, it may be seen that the Atkinson curve provides slightly higher efficiency than the Wittry curve. However, examination of FIG. 6 shows that it would be very difficult to achieve the expansion ratios that would be needed for the Atkinson curve to apply when $r_c$ is significantly greater than 6. In any case, it can be seen that the vented compression principle and the use of $r_e > r_c$ makes it possible to have both a high efficiency and also an adjustable compression ratio as is required for the glow ignition system to work well with gasoline as a fuel.

SUMMARY AND RAMIFICATIONS

It should be apparent that the invention described in this specification accomplishes all of the objectives of providing an engine that is superior to conventional internal combustion engines by providing the advantages of the rotary engine. It also allows the use of glow ignition with ordinary gasoline as well as with alternative fuels. Glow ignition further reduces the cost and weight of the engine. In addition, because the engine operates on the four-stroke cycle, the efficiency is high and the polluting emissions are low.

While the above description contains many specifications, these should not be construed as limitations of the scope of the invention but as examples of some preferred embodiments. Thus, the scope of the invention should be determined not by the embodiments described but by the appended claims.

I claim:

1. An improved rotary engine comprising:
   a) a housing having a cylindrical cavity with radially directed end walls, a cooling means, and inlet and outlet ports terminating in said cavity,
   b) two interdigitated rotors rotatably movable in said cylindrical cavity, each of said rotors having a hub, and two radial vanes, said vanes of the first of said rotors extending over the hub of the second of said rotors so that a seal is formed between the first said rotors and the second said rotors and between said rotors and said housing, whereby the cylindrical cavity is divided into four compartments,
   c) an ignition means consisting of at least two glow plugs, each of which contains a coil of refractory wire, said glow plugs being located at different angular positions relative to the axis of said cylindrical cavity.

2. An engine as describe in claim 1 in which said housing contains a passageway connecting a first of said compartments with a second of said compartments whereby gas can flow from the first said compartment to the second said compartment.

3. An engine as described in claim 2 in which said passageway contains a pressure-activated structure permitting said gas to move from the first compartment to the second compartment only when the pressure in the first said compartment exceeds a preselected value.

4. An engine as described in claim 3 wherein said pressure-activated structure comprises an adjustment structure for changing said preselected value while the engine is in operation.

5. An engine as described in claim 2 wherein said passageway contains a valve which changes the conductance of the said passage for the flow of said gas from the said first compartment to the said second compartment.

6. An engine as described in claim 1 in which the first said rotor has a rotor shaft movably passing through an axial hole in the second said rotor, said rotor shaft having at least one crank arm and crank pin, the second said rotor having at least one crank pin mounted in said hub and forming a crank of substantially the same length as the crank arm on said rotor shaft.

7. An engine as described in claim 6 having an output gear drive comprising a planet gear cage attached to an output shaft rotatably mounted in said housing coaxially with the axis of said cylindrical cavity, said planet gear cage containing at least two planet gears, each of said planet gears being mounted on rotatable planet gear shafts having crank arms, and said planet gears rotating about a sun gear that is fixed and coaxial relative to said housing, a coupling structure between each of said crank pins and crank arms on each of said planet gear shafts in said planet cage whereby motion of said planet gears about said sun gear imparts oscillatory angular motion superposed on uniform angular motion to each of said rotors.

8. An engine as described in claim 5 in which said output gear drive has four planet gears, two of said planet gears forming a pair which is coupled to the first said rotor and the other two forming a pair which is coupled to the second said rotor, with the two said gears making up each said pair being symmetrically located about the axis of the said sun gear so that dynamic balance is achieved.

9. An improved rotary engine comprising:
   a) a housing having a cylindrical cavity with radially directed end walls, a cooling means, and inlet and outlet ports terminating in said cavity,
   b) two interdigitated rotors rotatably movable in said cylindrical cavity, each of said rotors having a hub, and two radial vanes, said vanes of the first of said rotors extending over the hub of the second of said rotors so that a seal is formed between the first of said rotors and the second of said rotors whereby the cylindrical cavity is divided into four compartments,
   c) An ignition means consisting of at least two glow plugs each of which contains a coil of refractory wire, said glow plugs being located at different angular positions relative to the axis of said cylindrical cavity and said glow plugs having different thermal response times.

10. An engine as describe in claim 9 in which said housing contains a passageway connecting a first of said compartments with a second of said compartments whereby gas can flow from the first said compartment to the second said compartment.

11. An engine as described in claim 10 in which said passageway contains a pressure-activated structure permitting said gas to move from the first compartment to the second compartment only when the pressure in the first said compartment exceeds a preselected value.

12. An engine as described in claim 11 wherein said pressure-activated structure comprises an adjustment structure for changing said preselected value while the engine is in operation.

13. An engine as described in claim 10 wherein said passageway contains a valve which changes the conductance of the said passage for the flow of said gas from the said first compartment to the said second compartment.

14. An engine as described in claim 9 in which the first said rotor has a rotor shaft movably passing through an axial hole in the second said rotor, said rotor shaft having at least one crank arm and crank pin, the second said rotor having at least one crank pin mounted in a circular end plate attached to second said rotor and forming a crank of substantially the same length as the crank arm on said rotor shaft.

15. An engine as described in claim 14 having an output gear drive comprising a planet gear cage attached to an output shaft rotatably mounted in said housing coaxially with the axis of said cylindrical cavity, said planet gear cage containing at least two planet gears, each of said planet gears being mounted on rotatable planet gear shafts having crank arms, and said planet gears rotating about a sun gear that is fixed and coaxial relative to said housing, a coupling structure between each of said crank pins and crank arms on each of said planet gear shafts in said planet cage whereby motion of said planet gears about said sun gear imparts oscillatory angular motion superposed on uniform angular motion to each of said rotors.

16. An engine as described in claim 15 in which said output gear drive has four planet gears, two of said planet gears forming a pair which is coupled to the first said rotor and the other two forming a pair which is coupled to the second said rotor, with the two said gears making up each said pair being symmetrically located about the axis of the said sun gear so that dynamic balance is achieved.

* * * * *